United States Patent
McCoy et al.

(10) Patent No.: US 6,817,503 B2
(45) Date of Patent: Nov. 16, 2004

(54) MULTIPLE ACCESSORY PORT ASSEMBLY FOR A VEHICLE

(75) Inventors: Richard W. McCoy, Granger, IN (US); Thomas W. Lindenman, South Bend, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 180 days.

(21) Appl. No.: 10/182,105

(22) PCT Filed: Apr. 2, 2001

(86) PCT No.: PCT/US01/10633
§ 371 (c)(1),
(2), (4) Date: Jul. 23, 2002

(87) PCT Pub. No.: WO01/74622
PCT Pub. Date: Oct. 11, 2001

(65) Prior Publication Data
US 2003/0010800 A1 Jan. 16, 2003

Related U.S. Application Data

(60) Provisional application No. 60/194,502, filed on Apr. 3, 2000, and provisional application No. 60/243,486, filed on Oct. 26, 2000.

(51) Int. Cl.[7] ............................................. B60R 9/06
(52) U.S. Cl. ..................... 224/518; 224/547; 224/555; 280/491.5; 280/500; 280/514; 280/515
(58) Field of Search ............................ 224/512, 513, 224/518, 521, 524, 545, 547, 555; 280/491.2, 491.5, 495, 500, 504, 514, 515, 769; 414/462

(56) References Cited

U.S. PATENT DOCUMENTS

| | | | |
|---|---|---|---|
| 2,468,579 A | 4/1949 | Vuori | |
| 2,672,265 A | 3/1954 | Milstead | |
| 3,463,513 A | * 8/1969 | Burton | 280/495 |
| 3,768,837 A | * 10/1973 | Reese | 280/495 |
| 4,159,833 A | 7/1979 | Meiners | |
| 4,204,702 A | 5/1980 | Oltrogge | |
| 4,326,730 A | 4/1982 | Tomen | |
| 4,348,035 A | * 9/1982 | Wasservogel | 280/495 |
| 4,915,276 A | 4/1990 | Devito | |
| 4,950,010 A | 8/1990 | Denny | |
| 4,971,237 A | * 11/1990 | Davis | 224/518 |
| 5,096,102 A | * 3/1992 | Tolson | 224/512 |
| 5,215,234 A | 6/1993 | Pasley | |
| 5,476,279 A | 12/1995 | Klemetsen | |
| 5,497,927 A | 3/1996 | Peterson | |
| 5,620,198 A | 4/1997 | Borchers | |
| 5,699,985 A | 12/1997 | Vogel | |
| 6,428,031 B1 | * 8/2002 | McCoy et al. | 280/495 |
| 6,540,277 B2 | * 4/2003 | McCoy et al. | 280/495 |

* cited by examiner

*Primary Examiner*—Gary E. Elkins
(74) *Attorney, Agent, or Firm*—King & Schickli PLLC

(57) ABSTRACT

A multiple accessory port assembly (10) for mounting an accessory to the frame of a vehicle includes a frame member (12), a pair of mounting brackets (14, 14) for securing the assembly to the vehicle frame, and a pair of accessory ports (22, 22) carried on the frame. Each of the ports projects from the frame member and includes an opening (24, 24) for receiving the mounting port of an accessory such as a cargo carrier (C).

8 Claims, 5 Drawing Sheets

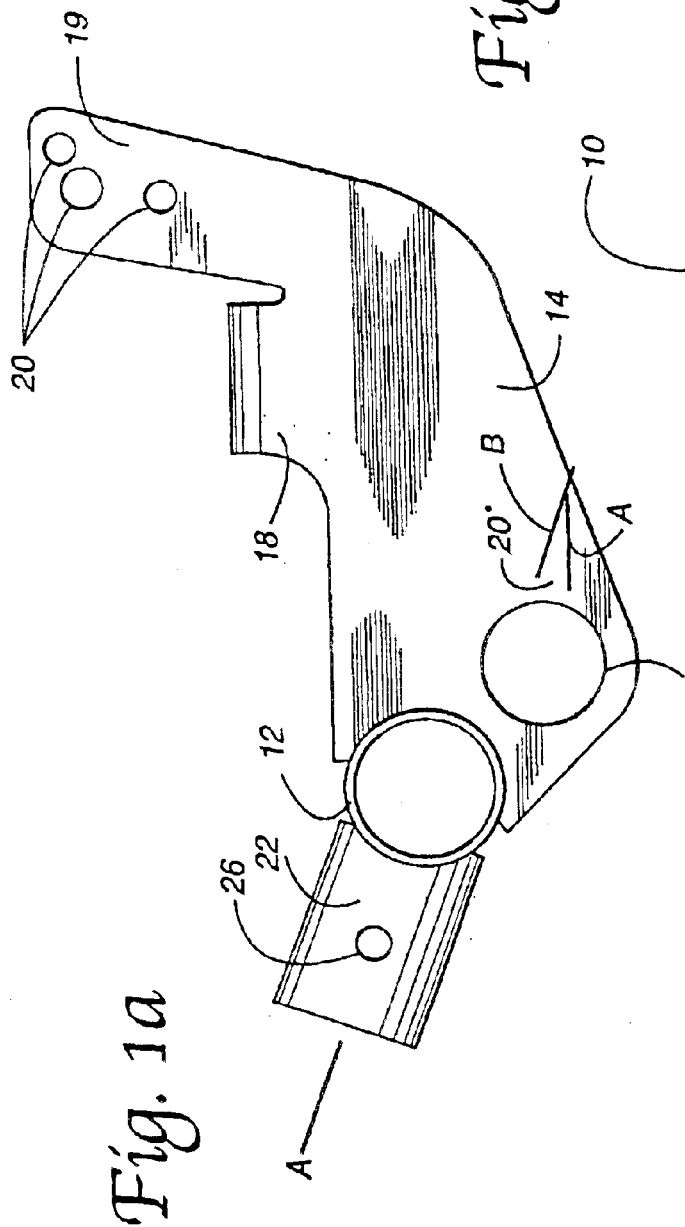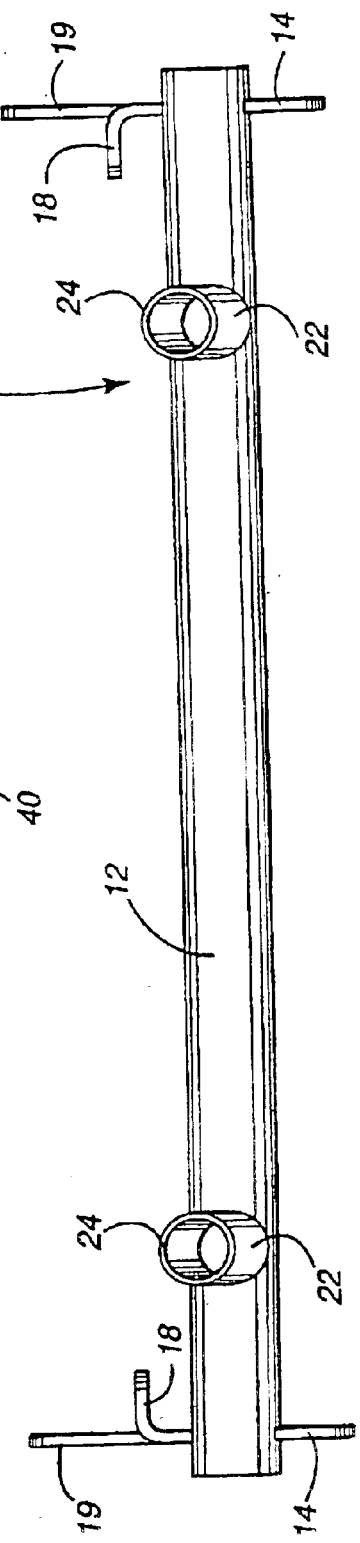

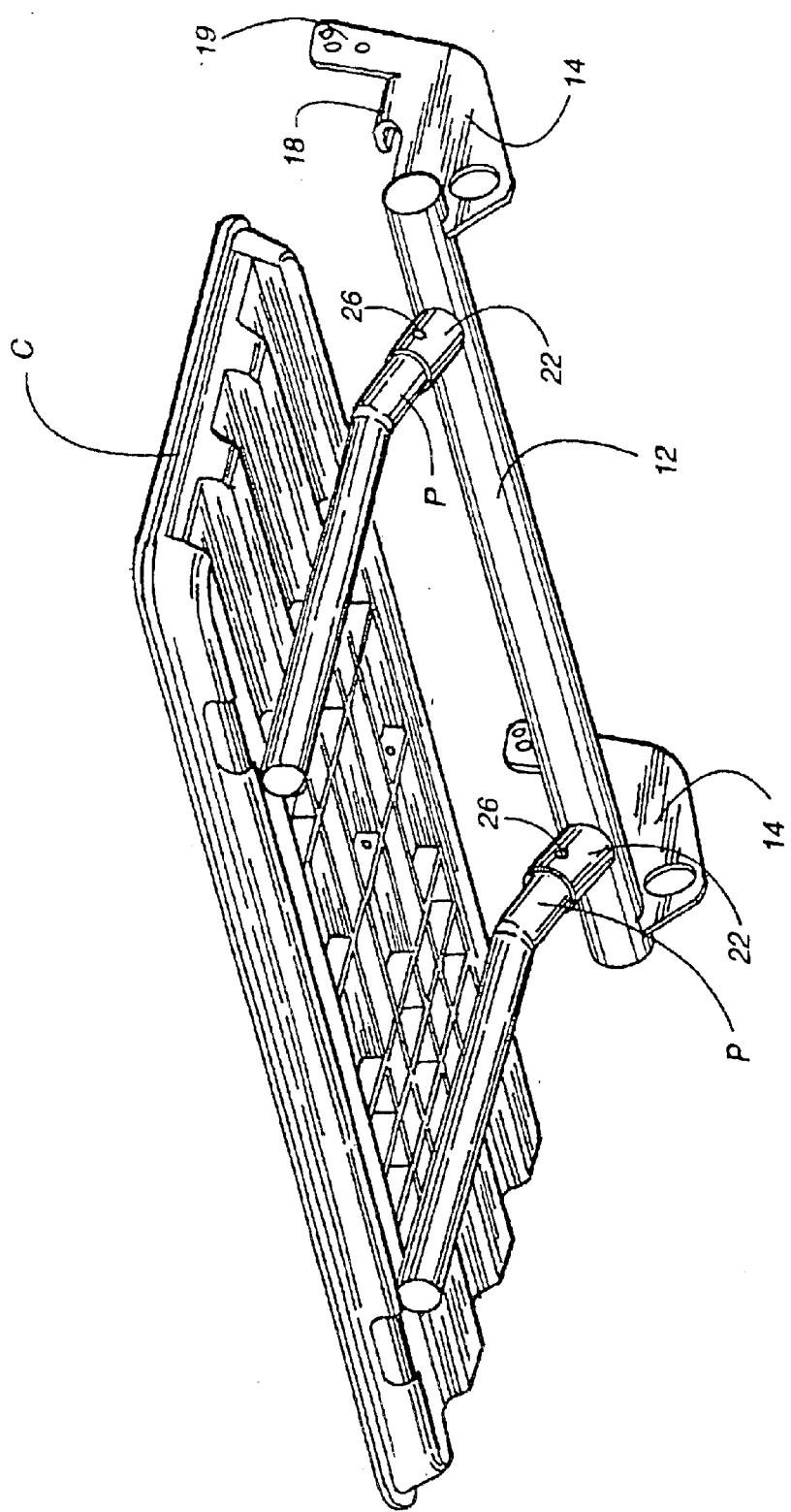

MULTIPLE ACCESSORY PORT ASSEMBLY FOR A VEHICLE

This is a U.S. National Stage Application of International Patent Application Serial No. PCT/US01/10633 filed Apr. 2, 2001 which claims the benefit of U.S. Provisional Application Ser. Nos. 60/194,502 filed Apr. 3, 2000 and 60/243,486 filed Oct. 26, 2000.

TECHNICAL FIELD

The present invention relates generally to the vehicle accessory field and, more particularly, to a multiple accessory port assembly for a vehicle incorporating at least two accessory ports for receiving and holding any number of recreational and utilitarian accessories such as a bike rack, ski rack, cargo carrier or the like.

BACKGROUND OF THE INVENTION

Vehicle accessories such as a bike rack, a ski rack, a snow board rack, a folding table, a work bench and a cargo carrier that may be conveniently secured to a vehicle when desired are increasing in popularity. Generally, these devices are secured directly to the vehicle bumper or through a trailer hitch receiver assembly carried by the vehicle. An example of the latter arrangement is disclosed in U.S. Provisional Patent Application Ser. No. 60/194,502 filed Apr. 3, 2000, entitled "Trailer Hitch Assembly With Towing Accessory Ports". The full disclosure of Provisional Patent Application Ser. No. 60/194,502 is incorporated herein by reference.

The direct mounting of a towing accessory to a vehicle bumper is no longer possible in many instances due to the bumper design on many of today's vehicles. Even when possible, many consumers decide against such a mounting arrangement as it commonly results in unsightly and, thus, undesirable damage to the bumper. As a consequence, most consumers install a trailer hitch receiver assembly on their vehicle if they are going to utilize accessories of the nature discussed and then mount those accessories to their vehicle through that hitch receiver assembly.

Of course, many smaller vehicles in the market today are of insufficient size and power to support trailer towing. As such, trailer hitch receiver assemblies are not available for these vehicles. Thus, to date, no mounting arrangement of this nature is available for securing accessories of the nature described to these smaller vehicles even though these vehicles are large enough and powerful enough to transport these accessories and the equipment or materials they hold.

A need is therefore identified for a multiple accessory port assembly for securing to smaller vehicles. Such a device also has useful application on larger vehicles where the owner desires the convenience of an easy and aesthetically pleasing way to secure various accessories to a vehicle yet has no interest in trailer towing capability.

SUMMARY OF THE INVENTION

In accordance with the purposes of the present invention as described herein, a multiple accessory port assembly for a vehicle is provided. The assembly includes a frame member, a mounting bracket carried on each end of the frame member for securing the frame member to the vehicle, and at least two accessory ports for receiving and holding one or more recreational and utilitarian accessories. Each of the accessory ports projects rearwardly from the frame member a distance D and includes a circular opening for receiving and holding at least one recreational and/or utilitarian accessory. Such a recreational and utilitarian accessory may include but is not limited to a bike rack, a ski rack or a cargo carrier.

More specifically describing the invention, each accessory port has a longitudinal axis extending in a plane A, the plane A defining an included angle of approximately 10–30° and more specifically 20° with the horizontal. As will be described in greater detail below, the relative orientation of the accessory ports with respect to the frame member and the vehicle to which the assembly is mounted insures ease of accessory alignment and mounting for the benefit and satisfaction of the user.

The present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1a is a side elevational view of the assembly of FIG. 1;

FIG. 1b is a rear elevational view of the assembly of FIGS. 1 and 1a;

FIGS. 2a and 2b are respective perspective and side elevational views showing the connection of a cargo/carrier platform in the accessory ports of the assembly.

Reference will now be made in detail to the present preferred embodiment of the invention, an example of which is illustrated in the accompanying drawings.

DETAILED DESCRIPTION OF THE INVENTION

Figure 1:
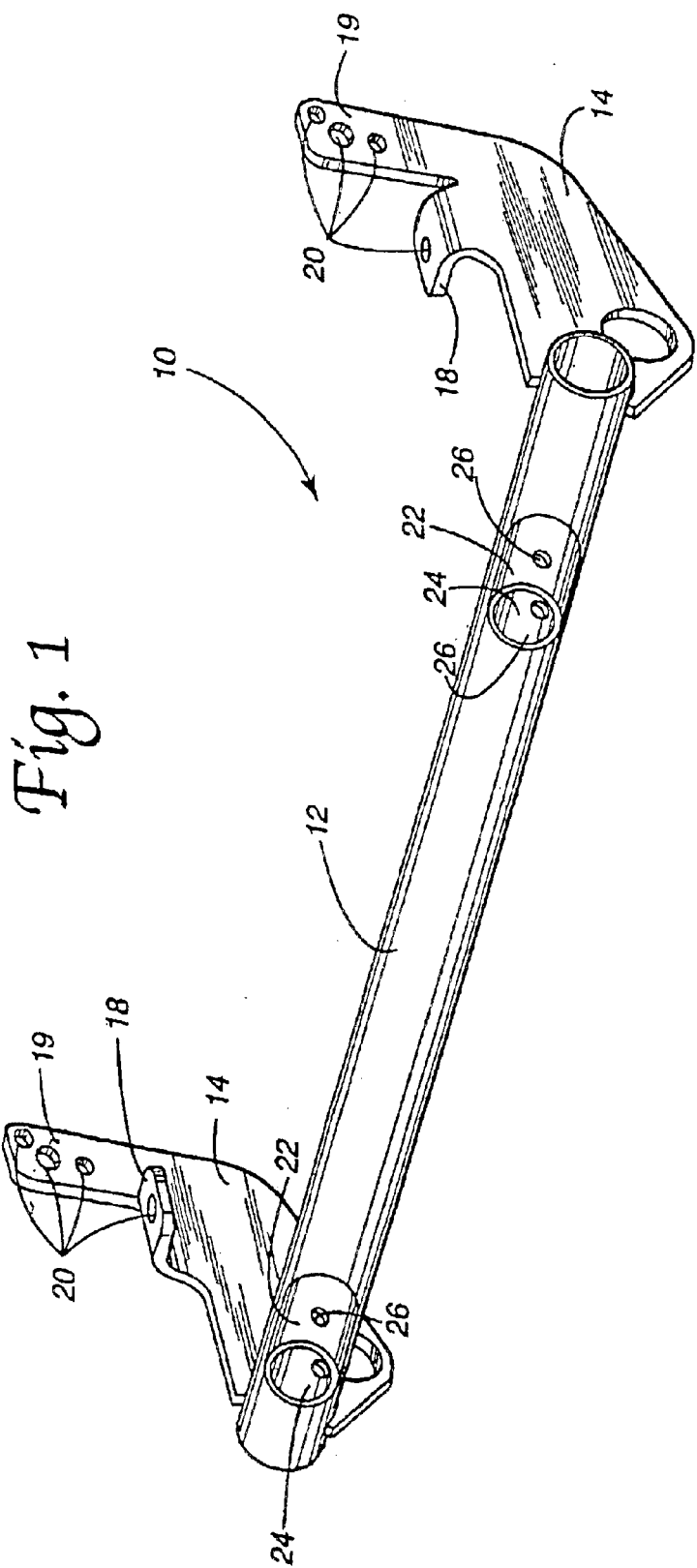
FIG. 1 is a perspective view of the multiple accessory port assembly of the present invention.

Reference is now made to FIGS. 1, 1a and 1b showing a multiple accessory port assembly 10 of the present invention. The assembly 10 includes a central frame member or cross member 12. The cross member 12 may be formed with a round cross section as shown in the drawing figures, a square cross section, an elliptical cross section or any other appropriate shape providing the necessary strength to function as a trailer hitch assembly.

Vehicle mounting brackets 14 are mounted adjacent the distal ends of the cross member 12. More specifically, each mounting bracket 14 includes a notch 16 sized and shaped to receive the associated end of the cross member 12. The brackets 14 are welded to the cross member 12 in order to complete the connection. The mounting brackets 14 each include a mounting flange 18 and an upwardly projecting mounting lug 19, both with apertures 20. Nut and bolt fasteners (not shown) are extended through these apertures 20 and cooperating apertures drilled in the frame F of the towing vehicle in order to mount the trailer hitch assembly 10 thereto. Of course, the arrangement of the mounting flanges 32 and/or mounting lugs 34 will vary from hitch assembly to hitch assembly in order to correspond to the frame of the vehicle to which the hitch assembly is to be mounted. As such, the arrangement and orientation of the flanges 32 and lugs 34 shown in the drawing figures are to be considered illustrative in nature rather than restrictive.

As also shown, the assembly 10 includes a pair of accessory ports 22 carried on the cross member 12. Each of the accessory ports 22 is formed from a steel tube that is welded to the cross member 12 so that the accessory ports are positioned between (i.e. inboard) the mounting brackets 14. Each accessory port 22 includes a circular opening 24 and cooperating aligned apertures 26 in the sidewall thereof to allow secure connection of an accessory by means of a connecting pin and pin clip of a type well known in the art.

Each of the accessory ports 22 is oriented with respect to the cross member 12 and the vehicle upon which the assembly 10 is mounted so as to be readily accessible by the vehicle operator. More specifically, as shown in FIG. 1a, each accessory port 22 has a longitudinal axis extending in a plane A. The plane A defines an included angle of approximately 10–30° and more specifically 20° with the horizontal. The manner in which the structural arrangement of the accessory ports 22 benefits the user when attempting to attach a recreational and utilitarian accessory will now be more completely explained with references to FIGS. 2a and 2b and 3. As shown in FIG. 3, when the assembly 10 is mounted to the Frame F of a towing vehicle, the cross member 12 is positioned directly under the bumper B of the vehicle. Both of the accessory ports 22 project rearwardly from the cross member 12 a distance D so as to extend to or beyond the rearmost edge of the bumper B. Additionally, the accessory ports 22 project upwardly at a angle of about 20° with respect to the horizontal. Thus, the circular openings 24 of the accessory ports 22 are both readily visible and accessible.

Figure 2B:
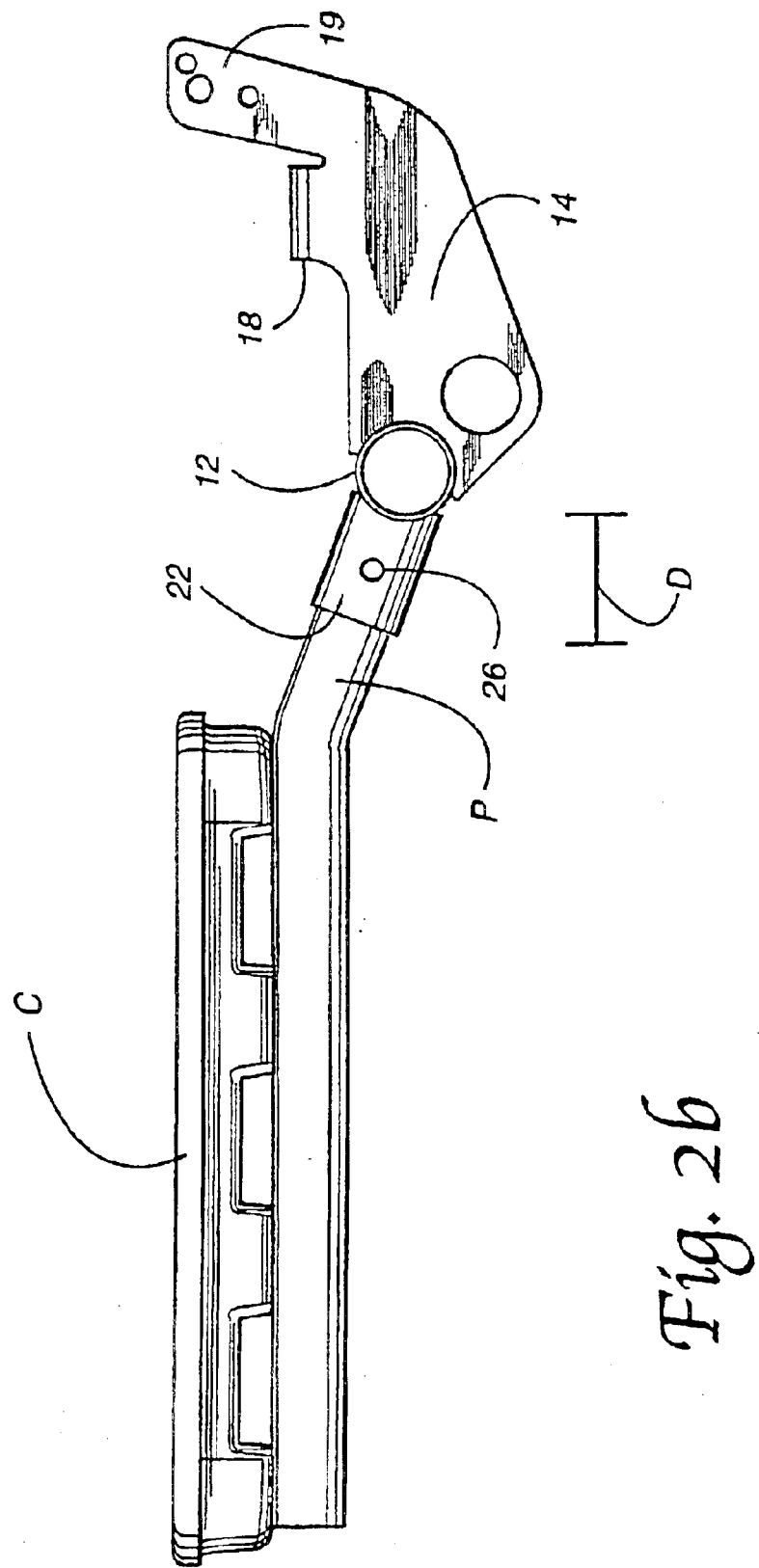
Figure 3:
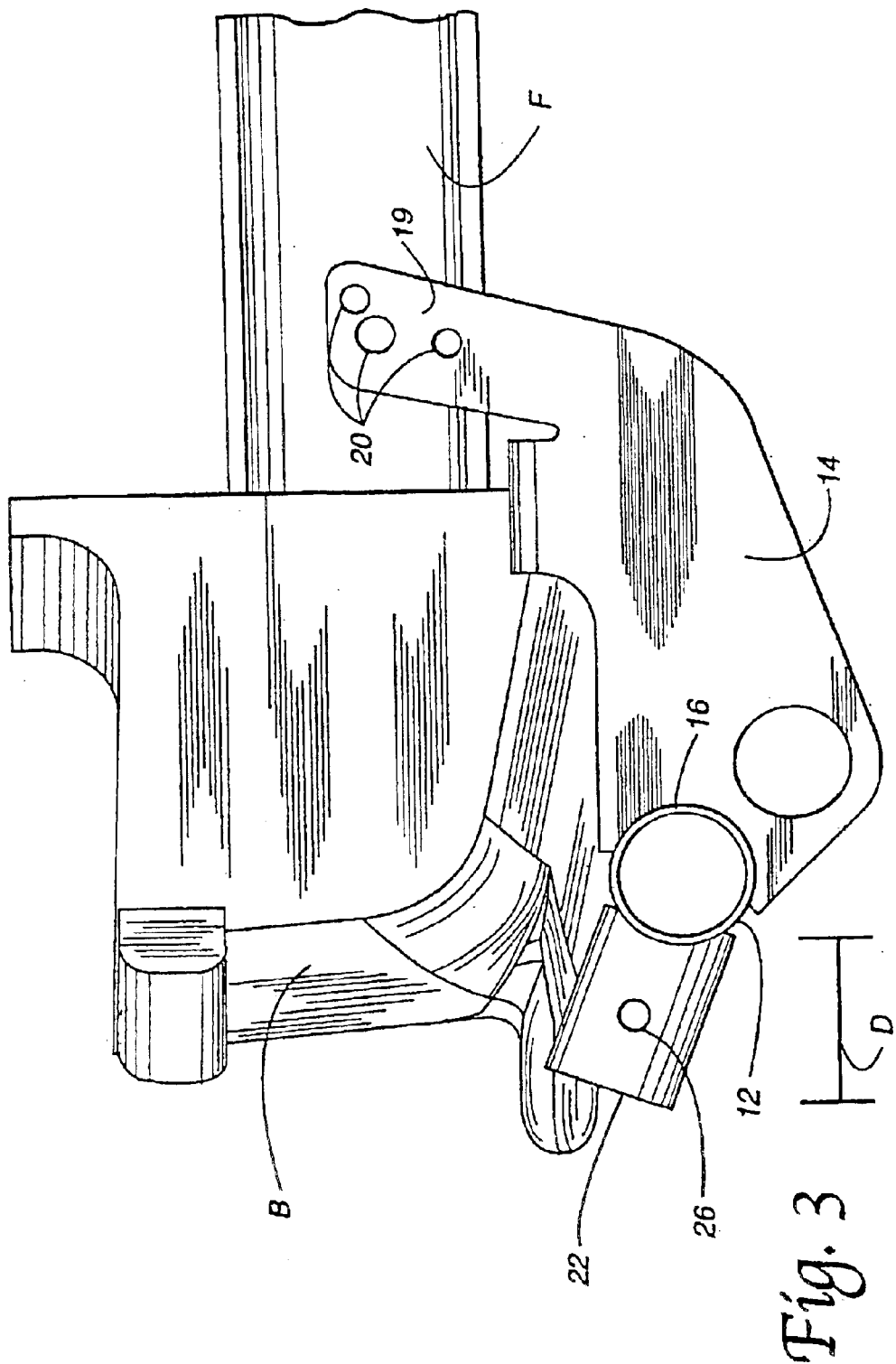
FIG. 3 is a side elevational view showing how both the accessory ports project upwardly and rearwardly under the bumper of a towing vehicle to which the assembly is connected.

Due to this fact, it is relatively easy for the user to engage the openings 24 of the accessory ports 22 with the mounting posts P of a recreational and utilitarian accessory such as a cargo carrier platform C (see FIGS. 2a and 2b). At this point, the circular shape of the accessory ports 22 and cooperating mounting posts P further insure ease of connection. Specifically, since the posts P and ports 22 are both round, they present continuous, uninterrupted mating sidewalls. Accordingly, it is not necessary to index the posts P in any way to insure proper geometry for mating; simple alignment is all that is necessary. Additionally, the post P may be flexed slightly in virtually any direction during mating as an additional aid when making the connection. As an added advantage, the lower projecting lip of the ports 22 provides a platform for supporting the majority of the weight of the accessory thereby easing manipulation thereof during attachment/connection.

Once properly aligned, the posts P slide readily into the ports 22. When fully seated, cross apertures (not shown) in the posts P are in alignment with the apertures 26. A connecting pin (not shown) is then positioned in these apertures and a pin clip (not shown) is used to secure the pin in position. The resulting two point connection through the ports 22 dramatically increases the stability of the connection between the accessory and the vehicle. This increased stability allows for a broad array of accessory opportunities. Of course, the recreational and utilitarian accessory C may be easily removed by removing the pin clips and connecting pins and pulling the posts P from the ports 22.

In summary, numerous benefits result from employing the concepts of the present invention. Accessories are mounted to the vehicle through the assembly 10 that is secured directly to the vehicle frame. Thus, accessory mounting does no harm to the aesthetic appearance of the vehicle including the bumper and its finish. Direct mounting to the frame also serves to provide maximum rigidity and support. This in combination with the multipoint mounting through two or more ports significantly enhances product performance and allows the apparatus 10 to stabily support a wide range of different accessories.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, while the ports 22 are shown projecting from the sidewall of the cross member 12, they could be welded or otherwise connected to the cross member along the underside or top side. Ports 22 of a different shape besides circular could also be provided (e.g., elliptical, square, rectangular, triangular, hexagonal). More than two ports 22 could also be provided to allow additional mounting points for extra stability or to provide the ability to receive and hold more than one accessory.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A multiple accessory port assembly for connecting to a vehicle, comprising:
   a frame member;
   a pair of mounting brackets connected to said frame member;
   a pair of accessory ports connected to said frame member inboard of said pair of mounting brackets, each of said accessory ports projecting rearwardly from said frame member a distance D and upwardly from said frame member including an opening for receiving a recreational and utilitarian accessory.

2. The assembly of claim 1, wherein said openings in said pair of accessory ports are circular.

3. The assembly of claim 1, wherein each of said accessory ports has a longitudinal axis extending in a plane A, said plane A defining an included angle of approximately 10–30° with a horizontal plane.

4. The assembly of claim 1, wherein each of said accessory ports has a longitudinal axis extending in a plane A, said plane A defining an included angle of approximately 20° with a horizontal plane.

5. The assembly of claim 2, wherein each of said accessory ports has a longitudinal axis extending in a plane A, said plane A defining an included angle of approximately 10–30° with a horizontal plane.

6. The assembly of claim 2, wherein each of said accessory ports has a longitudinal axis extending in a plane A, said plane A defining an included angle of approximately 20° with a horizontal plane.

7. The assembly of claim 1, wherein said frame member includes a first end and a second end, a first bracket of said pair of mounting brackets connected to said frame member proximate said first end and a second bracket of said pair of mounting brackets being connected to said frame member proximate said second end.

8. The assembly of claim 1, wherein said pair of accessory ports are spaced along a length of said frame member.

* * * * *